Sept. 13, 1927.

C. E. FRASER

SEARCHLIGHT

Filed Sept. 4, 1920

1,642,436

Charles E. Fraser
Inventor

Patented Sept. 13, 1927.

1,642,436

UNITED STATES PATENT OFFICE.

CHARLES E. FRASER, OF BROOKLYN, NEW YORK, ASSIGNOR TO THE GOVERNMENT OF THE UNITED STATES.

SEARCHLIGHT.

Application filed September 4, 1920. Serial No. 408,196.

My invention relates broadly to arc lamps and particularly to those types of arc lamps operated under high current density.

The object of my invention is to produce an arc lamp in which the carbon electrodes are protected from the action of air in the region near the arc, to insure that the carbon electrodes at the arc are of their original size.

Another object of my invention is to improve the Sperry lamp by eliminating the difficulties encountered therewith when using the lamp at high current density.

In all arc electrodes, the heat generated by the arc is conducted back along the electrode, heating the electrode to a red heat for a considerable distance back of the arc. On the high power arc this heating is intensified by the excessive current density at which the electrode is operated. The hot portion of the electrode back of the arc is in direct contact with the air, and therefore unless the electrode back of the arc for the entire hot portion is protected from the air, a phenomenon called "air burning" occurs which is the uniting of the hot carbon with oxygen in the air, causing the rapid consumption of the electrode back of the arc.

If air burning is permitted, it produces premature consumption of the electrodes, so that no definite and calculated diameter of electrode can be maintained at the arc due to the fact that the electrode diameter is reduced before it is fed to the arc. This feature applies to arc lamps of all types and in the street arc lamp was minimized by enclosing the entire arc in an air tight glass globe.

In any arc and especially in arcs of the gas type such as are used in high power searchlights for light projection and for motion picture arcs, the maximum efficiency is obtained when the light source diameter, which is the electrode tip, is maintained at a constant predetermined diameter.

The temperature of the electrode ½ inch back of the arc in any type of arc lamp will not reach the melting point of pure copper, and therefore if the cooling surface is designed to carry off this heat as rapidly as it is developed, metal can be used within ½ inch of the arc tip of the electrode of an arc lamp. This cooling may be accomplished by using a large radiating surface or by a forced draft as desired, or a combination of both.

It has been found that metal shields can not be used close to the crater of the arc for metal, although it has high heat conducting properties, has a high electrical conductivity relative to carbon even when at operating temperatures.

As a direct result of this, there is a tendency when the arc is established, for the current to follow the path of the lowest resistance and to jump to the metallic shield rather than flow through the electrode. As a result, the arc is poor in illuminating qualities and unsteady in operation.

With my improved electrode cap I have eliminated these undesirable qualities and have produced an electric arc that is steady in operation and which has a crater of constant diameter produced by the cooling of the electrode back of the crater without the objectionable feature of the arc current jumping to the metallic shield at times and puncturing it.

In view of this, therefore, my electrode cap may be termed a heat conducting, air insulating non-current carrying protective nose for electrodes of electric arc lamps, for use with arcs and electrodes operated at any angle in all planes.

My invention consists substantially in the construction, combination and arrangement of parts associated therewith or as will be more fully hereinafter set forth as shown by the accompanying drawings and finally pointed out in the appended claims.

Reference is to be had to the accompanying drawing forming a part of the specification in which like reference characters indicate corresponding parts throughout the several views and in which Figure 1 is an elevational view partly in section, of a positive electrode head assembly, the invention residing chiefly in the parts shown in full lines.

Figure 1:
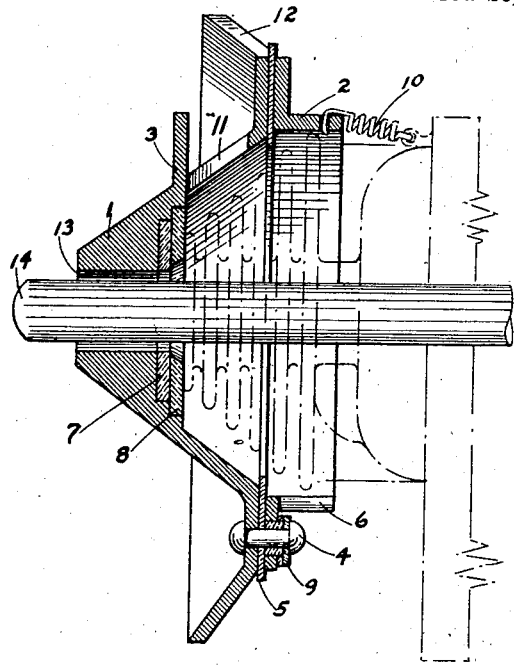

Referring to these drawings in detail, 1 indicates the head cap and 2 the retainer, both preferably made of a copper aluminum alloy of approximately 92% of pure copper mixed with 8% aluminum which has a melting point of about 1900° F. and an electrical conductivity of about 98% Mathiessen's standard and will not scale from oxidation when subjected to heat even beyond its melting point. With this design of cap the melting point of the metal used need not be higher than that of copper. On the cap 1 is provided a vent fin 3 at the upper side of the cap, the cap being secured to the retainer by means of rivets and washers 4 between which is positioned an insulating packing ring 5 with bushings 6. Insulating members 7 and 8 are also provided between the cap and the head assembly as well as around the rivet and adjacent the washer 4 as indicated at 9. In order to permit the desired flexibility of the cap with respect to the head, springs 10 are provided as indicated to hold the parts in assembled position. The cap, it will also be noted, is provided with an opening 11 near the vent fin 3 and is cut away at the top as indicated at 12.

The particular metal of which the cap is made is not a necessary factor in its operation, as it will work with cast iron, or copper or copper aluminum alloy or any metal with a high melting point. It has been found, however, of advantage to use a metal which will not scale from oxidization, due to the fact that this scale will tend to bridge the insulated gaps between the nose and the electrodes, thus destroying the non-current carrying feature. A copper-aluminum alloy has been found to best meet the requirements as regards scaling.

Figure 2:
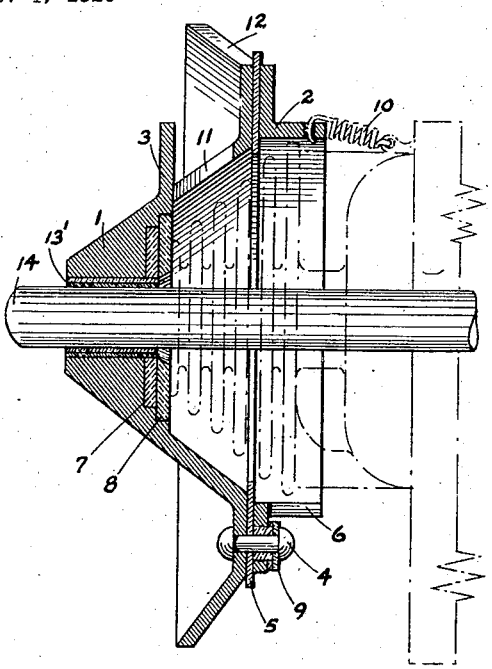
Figure 2 is a modification of the form shown in Figure 1.
Figure 3:
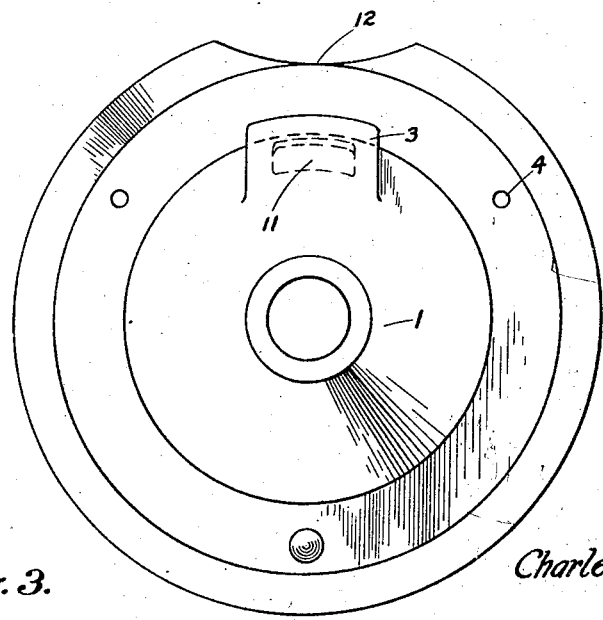
Figure 3 is an elevational view of the head cap.

The electrical insulation of this cap as a protecting tube for the positive electrode to prevent air burning is accomplished by leaving a suitable air space between the tube sides and the electrode, as designated at (13) Figure 1. This air space may be eliminated and mica or a suitable insulation used between the tube sides and the electrode as shown at (13') in Fig. 2.

Its advantages over all types at present in use are its simplicity of construction, its ability to rapidly conduct the heat from the electrode allowing the operation of the electrode at higher current densities, its elimination of the danger of destruction by the deflecting of the arc from the electrode, its entire absence of production of disturbing magnet fields in the vicinity of the arc due to its electrical insulation from all circuits and therefore its freedom from eddy currents, which will cause deflection and unsteadiness of arc, the shape of the nose, so designed as to be out of contact with the arc flame and when used in any position of electrodes from horizontal position to 90° vertical elevation, will tend to deflect air currents in such a direction as to keep the positive flame from surrounding the positive electrode back of the crater when the arc is burned on electrodes in position between the horizontal and vertical. This feature will render the arc suitable for use in a projector for illumination of aircraft in flight.

It will be understood that the above description and accompanying drawings comprehend only the general and preferred embodiment of my invention and that minor detail changes in construction and arrangement of parts may be made within the scope of the appended claims and without sacrificing any of the advantages of my invention.

What I claim is:

1. In combination with an arc lamp, an electrode, guiding and feeding means therefor, a metallic cap electrically insulated from the electrode and the guiding and feeding means, supporting means for the cap consisting of an annular ring resiliently attached to the guiding and feeding means and electrically insulated from the cap.

2. In a protective shield for an arc electrode, a plurality of sections electrically insulated from each other whereby the flow of eddy currents within the shield is materially reduced, at least one of the sections being insulated from all current carrying devices with which it is in mechanical contact.

Signed at Brooklyn, N. Y., this seventh day of June, 1920.

CHAS. E. FRASER.